United States Patent
Kuzma et al.

(10) Patent No.: US 7,298,264 B1
(45) Date of Patent: Nov. 20, 2007

(54) RFID TAG FILTERING AND MONITORING

(75) Inventors: Peter J. Kuzma, Richboro, PA (US); Charles A. Eldering, 524 St. Lawrence Way, Furlong, PA (US) 18925

(73) Assignee: Charles A. Eldering, Furlong, PA (US)

( * ) Notice: Subject to any disclaimer, the term of this patent is extended or adjusted under 35 U.S.C. 154(b) by 107 days.

(21) Appl. No.: 11/038,680

(22) Filed: Jan. 19, 2005

Related U.S. Application Data

(60) Provisional application No. 60/537,728, filed on Jan. 20, 2004.

(51) Int. Cl.
*G08B 13/14* (2006.01)
*G06F 17/00* (2006.01)
*G06F 3/048* (2006.01)

(52) U.S. Cl. .................... 340/572.1; 235/375; 715/847

(58) Field of Classification Search ............... None
See application file for complete search history.

(56) References Cited

U.S. PATENT DOCUMENTS

| | | |
|---|---|---|
| 5,029,183 A | 7/1991 | Tymes |
| 5,051,741 A | 9/1991 | Wesby |
| 5,144,313 A | 9/1992 | Kirknes |
| 5,163,004 A | 11/1992 | Rentz |
| 5,382,784 A | 1/1995 | Eberhardt |
| 5,500,651 A | 3/1996 | Schuermann |
| 5,584,065 A | 12/1996 | Monzello |
| 5,594,448 A | 1/1997 | d'Hont |
| 5,619,207 A | 4/1997 | d'Hont |
| 5,657,317 A | 8/1997 | Mahany |
| 5,661,457 A | 8/1997 | Ghaffari et al. |
| 5,708,423 A * | 1/1998 | Ghaffari et al. ............ 340/5.8 |
| 5,798,693 A | 8/1998 | Engellenner |
| 5,929,801 A | 7/1999 | Aslanidis et al. |
| 5,952,922 A | 9/1999 | Shober |
| 5,987,011 A | 11/1999 | Toh |
| 6,046,683 A | 4/2000 | Pidwerbetsky et al. |
| 6,069,564 A | 5/2000 | Hatano et al. |
| 6,075,973 A | 6/2000 | Greeff |
| 6,089,284 A | 7/2000 | Kaehler et al. |
| 6,094,173 A | 7/2000 | Nylander |
| 6,130,623 A | 10/2000 | MacLellan et al. |
| 6,150,921 A | 11/2000 | Werb et al. |

(Continued)

OTHER PUBLICATIONS

Hook, C. "The EPC Network, RFID and Data", Uniform Code Council, May, 23, 2003.

(Continued)

*Primary Examiner*—Julie Bichngoc Lieu

(57) ABSTRACT

A Radio Frequency Identification (RFID) system that tracks tags in real-time based on EPC codes and on other priority codes written into transponder memory fields of the tags. As an example, a priority code may be written into a memory of an RFID transponder identifying a high-value item or a small high-value item that is likely to be stolen. Based on the use of this priority code, those items can be preferentially tracked as opposed to items of low value or size such that they are unlikely to be stolen. Such use of priority codes and local filtering alleviates the need to go back to large centralized databases associating unique numbers with other parameters and potentially the history of the item.

8 Claims, 19 Drawing Sheets

U.S. PATENT DOCUMENTS

| | | | |
|---|---|---|---|
| 6,211,781 | B1 | 4/2001 | McDonald |
| 6,226,300 | B1 | 5/2001 | Hush et al. |
| 6,317,028 | B1 | 11/2001 | Valiulis |
| 6,354,493 | B1 | 3/2002 | Mon |
| 6,404,339 | B1 | 6/2002 | Eberhardt |
| 6,411,213 | B1 | 6/2002 | Vega et al. |
| 6,424,264 | B1 | 7/2002 | Giraldin et al. |
| 6,452,498 | B2 | 9/2002 | Stewart |
| 6,456,239 | B1 | 9/2002 | Werb et al. |
| 6,459,376 | B2 | 10/2002 | Trosper |
| 6,476,756 | B2 | 11/2002 | Landt |
| 6,480,108 | B2 | 11/2002 | McDonald |
| 6,483,427 | B1 | 11/2002 | Werb et al. |
| 6,496,806 | B1 | 12/2002 | Horwitz et al. |
| 6,512,478 | B1 | 1/2003 | Chien |
| 6,539,393 | B1 | 3/2003 | Kabala |
| 6,539,396 | B1 | 3/2003 | Bowman-Amuah |
| 6,557,760 | B2 | 5/2003 | Goodwin, III |
| 6,587,835 | B1 | 7/2003 | Treyz et al. |
| 6,600,443 | B2 | 7/2003 | Landt |
| 6,611,758 | B1 | 8/2003 | Nysen |
| 6,624,752 | B2 | 9/2003 | Klitsgaard et al. |
| 6,640,253 | B2 | 10/2003 | Schaefer |
| 6,657,543 | B1 | 12/2003 | Chung |
| 2005/0125745 | A1* | 6/2005 | Engestorm et al. ......... 715/847 |
| 2006/0047789 | A1* | 3/2006 | Kumar et al. ............... 709/220 |

OTHER PUBLICATIONS

Scher, B. "Dynasys Gamma Gateway High Frequency RFID Antenna", Tirfid TIRIS Tag-it RFID Tags from Dynasys-Gamma Gateway, Jul. 3, 2003, http://www.rfidusa.com/rfid_gamma_gateway.html, 3 pages.

"Flint Bets on Printed RFID Antennas", RFID Journal, Jul. 3, 2003, http://www.rfidjournal.com/article/articleprint/288/-1/1, 2 pages.

Sun's Auto-ID Architechture, White Paper, Jun. 2003, www.sun.com/software, 10 pages.

Rao, K.V.D. et al., "On the Read Zone Analysis of Radio Frequency Identification Systems with Transponders Oriented in Arbitrary Directions", Microwave Conference, 1999, 3, 758-761.

Salonen, P. et al., "An Intelligent 2.45 GHz Multidimensional Beam-Scanning X-Array for Modern RFID Reader", Antennas and Propagation Society International Symposium, 2000, 1, 190-193.

Salonen, P. et al., "A 2.45 GHz Digital Beam-Forming Antenna for RFID Reader", Vehicular Technology Conference, 2002, 4, 1766-1770.

Cichos, S. et al., "Performance Analysis of Polymer Based Antenna-Coils for RFID", Polymers and Adhesives in Microelectronics and Photonics, 2nd International IEEE Conference, 2002, 120-124.

Marrocco, G. et al., "Evolutionary Design of Miniaturized Meander-Line Antennas for RFID Applications", Antennas and Propagation Society International Symposium, IEEE, 2002, 2, 362-365.

Want, R., "RFID-A Key to Automating Everything", Scientific American, Jan. 2004, 56-65.

Finkenzeller, Klaus, "The RFID Handbook",SAW Transponder, 1999,pp. 49 & 101, John J. Wiley & Sons, Inc., New York, NY.

Salonen, P. et al., "A Novel Bluetooth Antenna On Flexible Substrate For Smart Clothing", Systems, Man, and Cybernetics, 2001, 2, 789-794.

RFID, Inc., "RFID Frequencies Tutorial", Mar. 2006, www.rfidinc.com/tutorial.html, 3 pgs.

* cited by examiner

96 BIT ID# = MANUFACTURING COMPANY CODE
　　　　　　SKU CODE
　　　　　　UNIQUE #

RFID TAG FILTERING AND MONITORING

CROSS-REFERENCE TO RELATED APPLICATIONS

This application claims the benefit of provisional application 60/537,728, entitled RFID Tag Filtering and Monitoring; the inventors of which are Peter J. Kuzma and Charles A. Eldering; filed Jan. 20, 2004.

BACKGROUND OF THE INVENTION

RFID systems including tags, also known as transponders, and readers, are being deployed in order to track objects for a variety of purposes. This can include tracking of objects in a warehouse or retail environment to determine where objects are and to insure that the product flow from factory to consumer is adequate and optimized. The advent of RFID will allow tracking of individual items based not only on product code but also on individual numbers. This opens up a multitude of possibilities for increasing the efficiency of shipping and sales of customer goods as well as tracking theft in various fields.

The multitude of objects to be read, especially in the retail environment, also creates numerous problems related to the tracking of those items. For example, it will be possible with RFID technology to read all of the items in a store such as a retail outlet or grocery store. The large number of items in a store results in difficulties in organizing that information and in tracking particular items as they leave the shelves. As an example, a store may wish to track high-value items that may be stolen but will have to determine what those items are based on movement of all items within the store. This can lead to tremendous bottlenecks in data processing and can overwhelm servers and the computers that are called upon to do such filtering As a specific example of the data processing problems that arise in RFID, the EPC code that has been agreed upon by the industry is a 96-bit code which includes the manufacturing company code, an SKU code, and a unique ID number for that particular item. The advent of these EPC codes allows, in theory, the tracking of all items but, in reality, tracking of items even within the store becomes a data processing nightmare. Furthermore, if the store wishes to track items that have arrived at a particular store or are being taken off the shelves after having arrived from a particular transport system, it will be necessary to go back to a centralized database to compare those EPC codes with the data history for those particular items. This can be particularly processor intensive and under some circumstances may be impossible based on the need to retrieve data from multiple databases in real-time while an object is being moved through the store or warehouse.

For at least these reasons, there is a need for a system which is able to better filter and track items containing RFID codes such as EPC codes.

SUMMARY OF THE INVENTION

The present system describes a method for filtering of RFID tag data such that RFID tags can be tracked in real-time based on EPC codes and on other priority codes written into transponder memory fields. In one embodiment, the transponder contains a memory field indicating the store in which the item has been stocked. Having listed the store, it is possible for readers to filter based not only on ID number and information in the EPC but also based on the store ID written into the tag. This facilitates tracking of items that have arrived from another store, are being returned from another store perhaps not part of that chain, or which have had their store ID erased perhaps in an illegal manner In another embodiment, priority codes are written into the transponders, and readers and data systems connected to the readers use those priority codes to track those particular items. As an example, a priority code may be written into a high-value item or a small high-value item that is likely to be stolen. Based on the use of this priority code, those items can be preferentially tracked as opposed to items of low value or size such that they are unlikely to be stolen. An advantage of this system is that the ID number, EPC code, and unique number do not need to be referred to and a very simple and rapid filtering process can be performed either at the reader level or in the network to which the reader is immediately connected to. This alleviates the necessity to go back to a larger centralized database to associate the unique number of the item with a list of items that may be potentially stolen.

In yet another embodiment, priority codes are written into the transponder to preferentially track those items not because of potential of theft but because of other reasons that make those transponders and tags and the items associated with those transponders of higher importance than other transponders in the system. As previously described, use of priority codes and local filtering alleviates the need to go back to large centralized databases associating unique numbers with other parameters and potentially the history of the item. By writing into the transponder RFID tag and performing local filtering, the data processing on the multitude of tag data coming back is greatly simplified.

In another embodiment, velocity tracking of transponders is used to establish a threshold for local filtering. In this embodiment, the velocity of an RFID tag through a given environment such as a warehouse or a retail outlet is monitored. Those items having a velocity exceeding a particular threshold are immediately tracked, either through tracking by the read-only memory, or by tracking through an additional field written into the tag to note that that item is of particular interest because of its velocity. In this embodiment, transponders identified by their velocity or by their velocity in combination with a written field or a written field which has been established because of their velocity, are preferentially tracked within a reader, a local assembly of readers, or a local area network within a store to determine where the item is headed and to monitor its presence in the store. One application of this embodiment is the use to track items in a store which may be being stolen because they are moving through the store rapidly. As an example, the common mode of shoplifting called "pick and run" is exemplified by a thief who has put an item in his pocket and is simply running through the store. Instead of returning to a centralized database to analyze the unique number or other items associated with the ID number, the velocity of that RFID tag causes an alarm to be triggered indicating to the store personnel that an RFID tag has achieved an exceptionally high velocity and should be monitored. In one embodiment, this information is passed to the registers or to the security system or a personal alert device held by a security guard and the individual or individuals believed to be holding that RFID tag are monitored or detained. In an alternate embodiment, the system reports the present velocity and predicted future velocity of that RFID tag to registers or a security system such that the person can be intercepted.

BRIEF DESCRIPTION OF THE DRAWINGS

The accompanying drawings, which are incorporated in and form a part of the specification, illustrate embodiments of the present invention and, together with the description serve to explain the principles of the invention. In the drawings.

DETAILED DESCRIPTION OF PREFERRED EMBODIMENTS OF THE INVENTION

Figure 1:
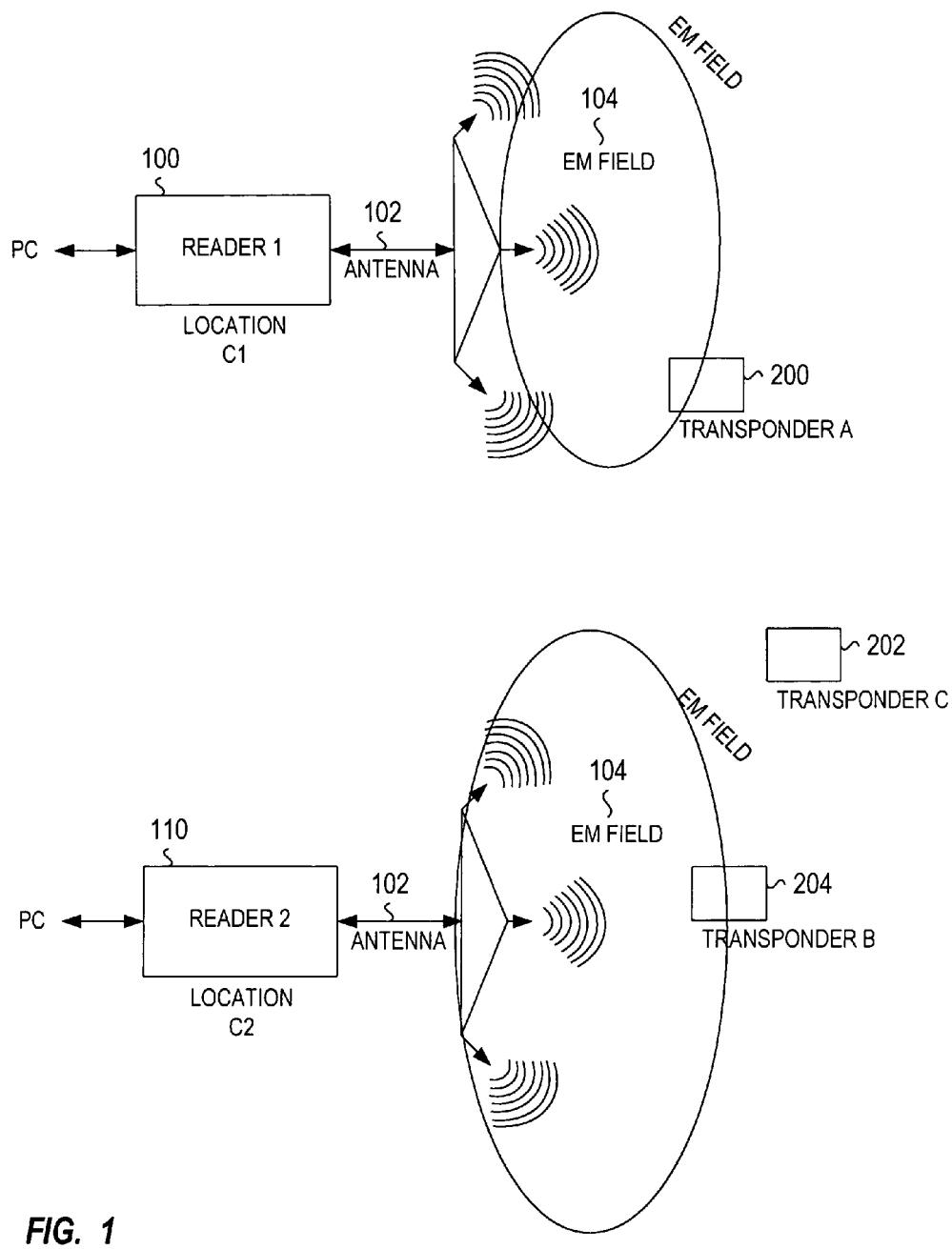
FIG. 1 shows that readers in a particular environment read tags through the use of both near field inductive coupling and far field electromagnetic waves.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

FIG. 1 illustrates that readers in a particular environment read tags through use of both near field inductive coupling and far field electromagnetic waves. As shown in FIG. 1, reader 100 transmits a signal from antenna 102, generating an electromagnetic field 104 which strikes transponder A 200. Transponder A 200 returns a back-scattered signal which is read by reader 100 indicating that the tag is present at that location. As will be understood by those skilled in the art, a variety of RFID systems can be used to create the reader transponder system including passive RFID and active RFID. A number of standards are in place for such systems which are readily available. As also shown in FIG. 1, a second reader 110 also may read tags and, as shown, can read transponder B 204 but cannot read transponder C 202. As shown in FIG. 1, transponder C 202 is read neither by reader 110, nor by reader 100.

Figure 2:
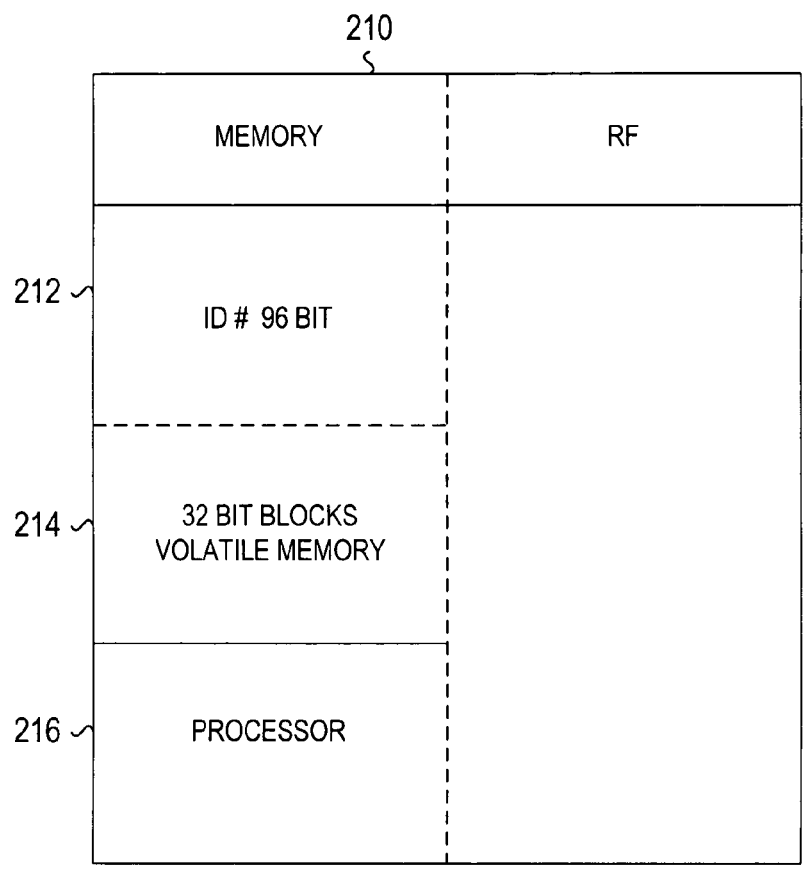
FIG. 2 illustrates a typical transponder device with a memory including the item's 96-bit ID number, 32-bit blocks of volatile memory, and a data processor used to assist in the writing or reading of the memory.

FIG. 2 illustrates a typical transponder device from FIG. 1. In this example, transponder 210 contains a memory that allows storage of an ID number 212 that, in one embodiment, is a 96-bit number containing a manufacturing company code, an SKU or EPC code, and a unique ID number. The unique ID number is different for each item whereas the SKU or EPC code represents a particular designated product or type of item and the manufacturing company code represents the company or the company that produced the item. In addition, the memory of transponder 210 may contain volatile memory 214 structured in 32-bit blocks or other size blocks. This memory 214 allows for writing in of data to the transponder 210 in addition to reading of the ID number 212. Processor 216 may also be present to allow for local processing of data and is used to assist in the writing or reading of the memory. An RF section is present in the transponder 210 to receive the illumination signal from the reader and to perform back-scattered modulation of the data onto the reflected signal such that the transponder 210 can be read. Since a number of standards have been developed to support the rapid deployment of transponders and the methods for establishing communications between the reader and the transponder tag are well understood by those skilled in the art, such standards and methods will not be elaborated upon here.

Figure 3:
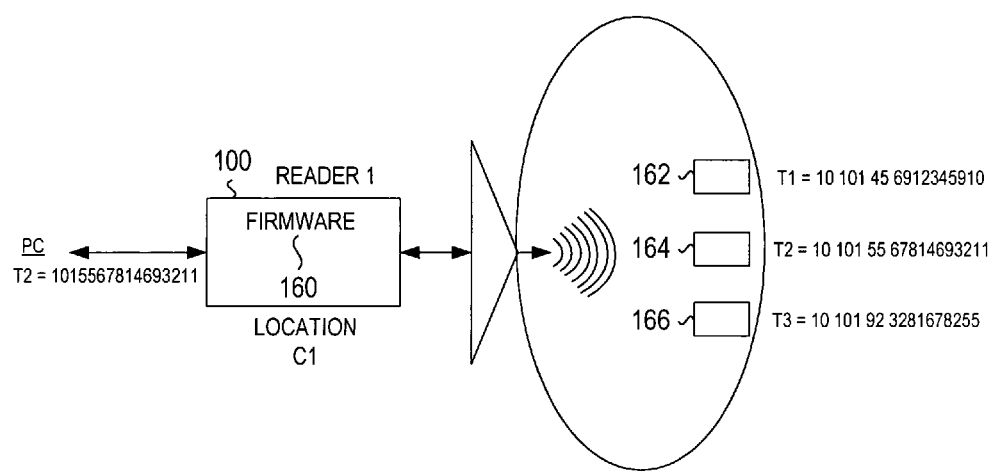
FIG. 3 shows a reader that is able to read transponders and process their unique ID numbers to determine whether that item has been read at the location of that particular reader.

FIG. 3 illustrates reader 100 disposed so as to be able to read transponders 162, 164, and 166, each containing a unique ID number. Firmware 160 in reader 100 is adapted to process these unique ID numbers and to determine whether the item corresponding to each unique ID number previously has been read at the location of reader 100.

In the embodiment of FIG. 3, firmware 160 in reader 100 can be set such that only items of interest are reported. As illustrated in FIG. 3, three tags, 162, 164, and 166 are read by reader 100; however, in this embodiment, only the presence of tag 164 is reported to the system which may be a PC or network connected to reader 100. In this embodiment, the firmware 160 in reader 100 performs filtering based on unique ID number of the tags being read at that location.

Figure 4:
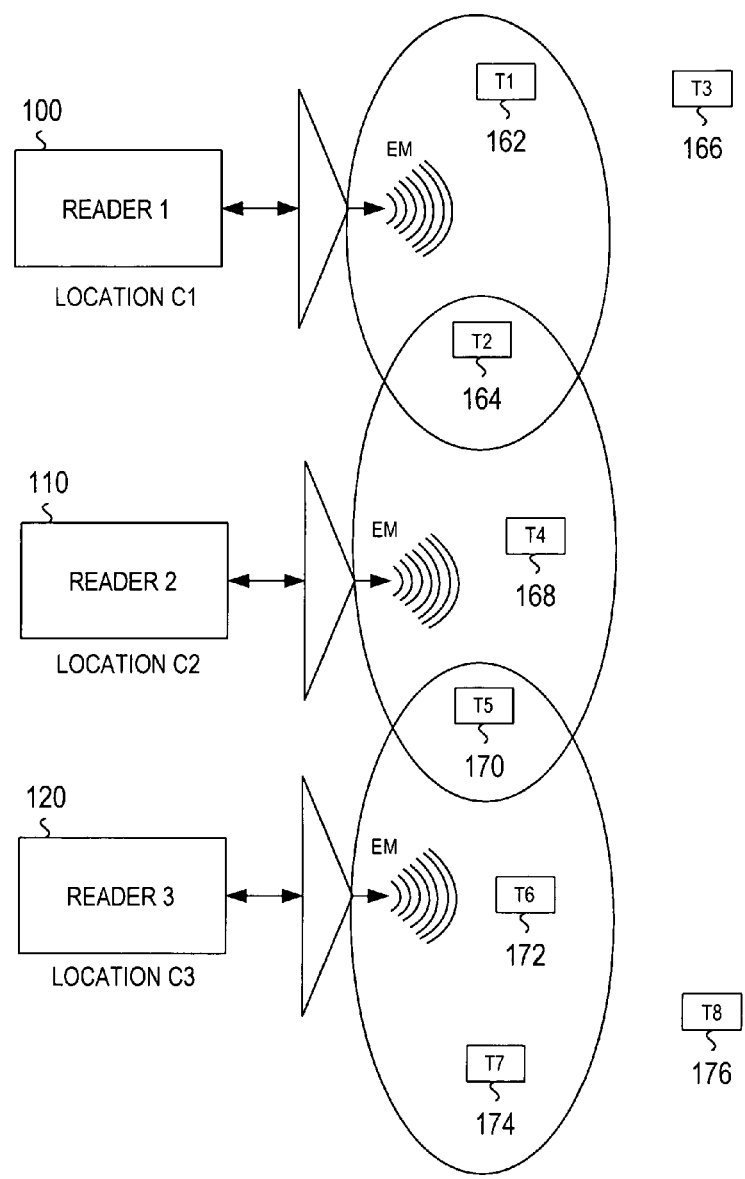
FIG. 4 illustrates how multiple readers can read the same tag, which may be in a position such that the fields from respective readers overlap.

It is also possible to use other codes written into the volatile memory 214 (FIG. 2) of the tag to provide the basis for the filtering. In this embodiment, reader 100 contains firmware 160 which looks for not only ID numbers but also can base its filtering decisions on data written into the volatile memory 214 of the tags. As an example, the firmware may read tags 162, 164, and 166 but find that only one of those tags has a field of interest or a field containing a code such that the presence of that tag should be reported out of reader 100. As will be further discussed, these codes may be based on priorities or particular parameters not described in the unique ID number and allow for the reader 100 to filter based on those fields written into the volatile memory 214 of the transponder or tag FIG. 4 illustrates how multiple readers can read a tag in a position such that the fields from respective readers overlap and cause signals from multiple readers to strike the tag, resulting in that tag being read by more than one reader. FIG. 4 illustrates tags 162, 164, 166, 168, 170, 172, 174, and 176, where particular tags are within the ranges of particular readers 100, 110, and 120. In this example, tag 162 is only read by reader 100 but tag 164 is read both by reader 100 and reader 110. Tags 166 and 176 are out of range and hence not read by any reader. Tag 168 is only read by reader 110 and tags 172 and 174 are only read by reader 120, while tag 170 is read both by reader 110 and reader 120.

In one embodiment, reader 100 and reader 110 are able to communicate with each other either directly, through a network, or through a network with a centralized server. In this embodiment, reader 100 and reader 110 use filtering between both readers to determine if the tag that has been commonly read, in this case 164, should be reported. For example, in one embodiment, reader 100 and reader 110 use the reading of tag 164 and the 96-bit code to determine if that reading should be reported to other readers or a centralized system. In an alternate embodiment, reader 100 and reader 110 compare fields written into the tag to determine if that tag 164 should be read. One advantage of this system is that if reader 100 and reader 110 singly or jointly decide that a read tag is of interest, the reading of that tag by either reader can be reported. As an example, reader 100 may have filtering instructions such that it does not believe that the reading of tag 164 is critical, but reader 110 has an indication that reading of that tag should be reported and thus indicates to reader 100 and a centralized system that that tag has been read and should be tracked. In an alternate embodiment, voting takes place between two or more readers to determine if tags that have been read are of significant importance to be reported. In this embodiment, the reading of tags such as tags 164 or 170 by multiple readers is filtered as a group to determine if that tag should be further tracked or if those reads should be discarded.

Figure 5:
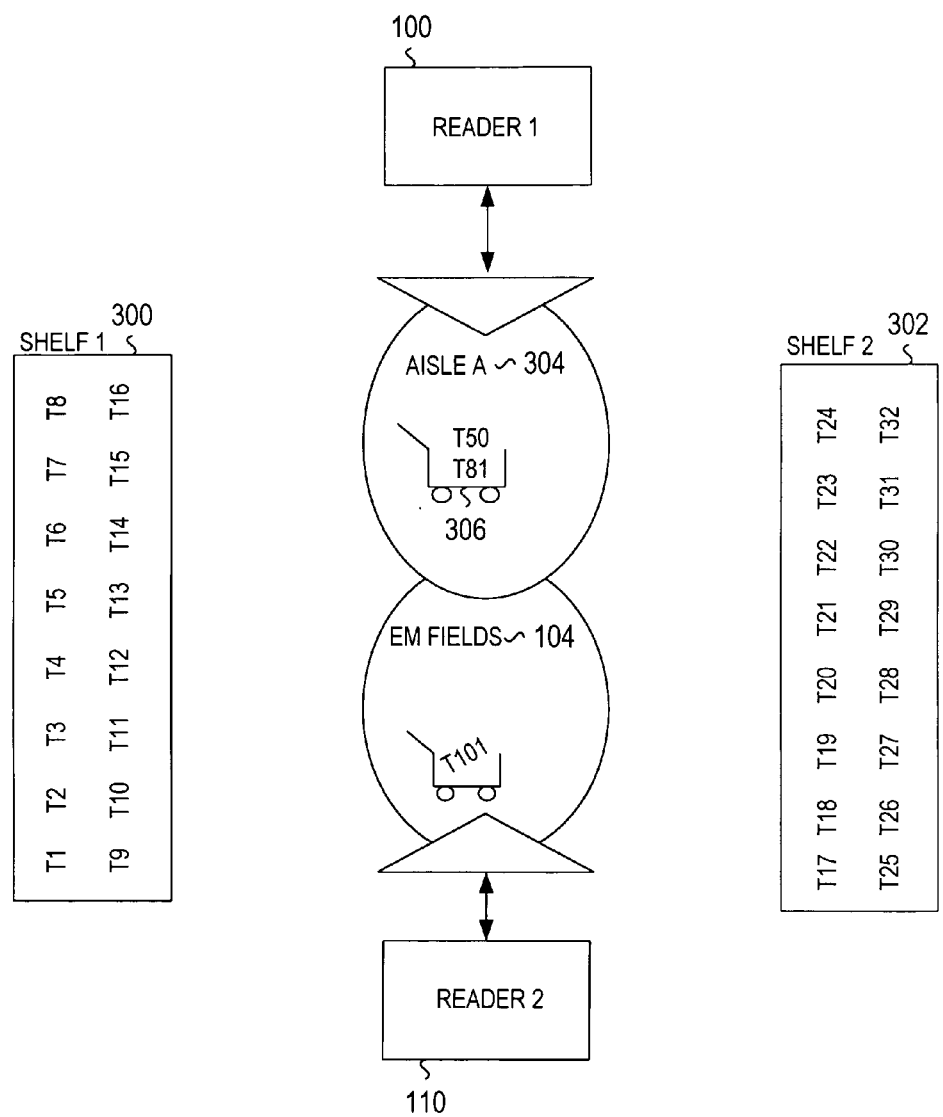
FIG. 5 shows how directed reading can be performed based on illumination of tags in particular, geometric areas.

FIG. 5 illustrates how directed reading can be performed based on illumination of tags in particular geometric areas. As illustrated in FIG. 5, shelf 300 and shelf 302 contain items with tags that can be preferentially left unilluminated such that those tags are not read. In this embodiment, reader 100 is placed in aisle 304 such that tags can be read in the aisle. In one embodiment, filtering of tags based on their having been read in that aisle 304, as can occur when the tags are in shopping cart 306, may be performed. In this embodiment, other readers may be used to read the shelves, but those tags are not monitored unless they are subsequently read in the aisles. As an example of use of this embodiment, stores may monitor all of the items on the shelves and in the aisles but choose only to filter those items that have actually entered the aisles and are likely to be moving. In this embodiment, velocity itself need not be tracked, but presence of the items in the aisles themselves is sufficient to trigger tracking of those tags.

In an alternate embodiment, reader 100 and reader 110 are constructed such that they can direct their electromagnetic fields 104, either through individual tuning of antennas or through coordinated tuning of antennas to focus electromagnetic energy into the aisles and track the tags read in those aisles. As shown in the embodiment of FIG. 5, readers are configured such that their electromagnetic fields 104 are directed at the aisle 304 rather than the shelves 300 and 302, and that reads from those readers are filtered because those items are in the aisles.

In an alternate embodiment, readers are designed such that their electromagnetic fields 104 can be coupled to read the shelves only, and filtering is performed on the items in the shelves rather than in the aisles. In this embodiment, shelf tracking is performed, and aisle tracking, if performed, is performed either through separate readers or another monitoring system entirely.

In yet another embodiment, both shelf reads and aisle reads are performed. In this embodiment, the store or warehouse is able to monitor the actual inventory, which is the inventory that is on the shelves and is not going to leave the store or warehouse within a short period of time. As an example, all of the items on shelf 300 and 302 illustrated in FIG. 5 can be considered inventory, whereas those items in the shopping cart 306 headed towards the check-out lanes should not be considered inventory, or may be considered inventory that has left the shelves but has not been paid for yet. By knowing both shelf inventory and what can be termed as "cart inventory," it is possible to better monitor where the items are in a store and what is happening to them. These systems can, of course, be coupled with the point-of-sale systems that report actual sales of an item and, as such, shrinkage or non-shelf returns can be closely monitored.

One of the advantages of having a separate shelf-reading system from an aisle-reading system is that the two systems can coordinate and better monitor total inventory and not simply attempt to recognize items on the shelves as the entire inventory of the store. Again, when coupled with point of sale, a very accurate reading of the entire workings of the store or warehouse can be performed.

Figure 6:
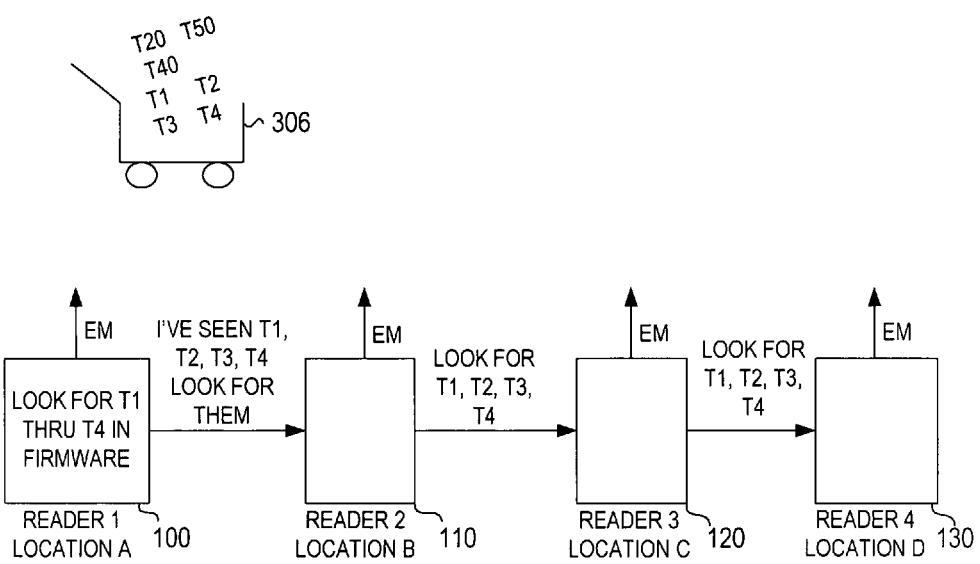
FIG. 6 shows that readers can report reads of certain tags to other readers and indicate to those readers that those tags in particular should be tracked.

FIG. 6 illustrates an embodiment in which readers can report reads of certain tags to other readers and indicate to those readers that those tags in particular should be tracked. As an example, and as shown in FIG. 6, reader 100 has been instructed to look for tags T1 through T9. When a shopping cart 306 passes by, reader 100 notices that only certain tags are present and reader 100 reports on to a second reader, reader 110, that "I have seen tags T1, T2, T3, and T4. You are now instructed to look for them." Reader 110 performs filtering for those particular tags and reports the tags seen by it on to reader 120. Similarly, reader 120 performs filtering and reports its having seen tags T2, T3, and T4 to reader 130. An advantage of this system is that each reader can be taught by another reader as to on what parameters it should base its filtering. This eliminates the need for the readers to either contain a complete database of filtering parameters for all tags, or to return to a centralized database within the store or at another location to determine on what to base its filtering. It should be noted that, as noted above with respect to FIG. 2, this type of filtering can be both performed on the 96-bit code written into the memory that is present in the memory of the tags, but may also be based on specific fields written into the tags for filtering purposes.

Figure 7:
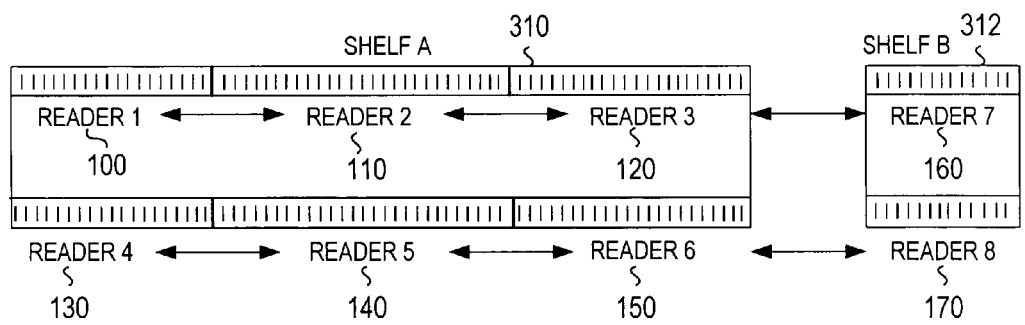
FIG. 7 illustrates the synchronized reading and filtering of tags using shelf readers.

FIG. 7 illustrates the coordinated reading and filtering of tags using shelf readers. Shelf 310 contains readers 100, 110, 120, 130, 140, and 150, where each reader is designated to a portion of shelf 310, as shown. Readers may be present on shelf 310 such that reader 100 covers a portion of shelf 310 and can speak with reader 110 which covers a second portion of shelf 310. By being able to communicate, either directly or through a centralized network or server, reader 100 and reader 110 can share information as to what filtering should take place. As an example, an item may leave shelf 310 near reader 100 which notes that a tag has left its shelf and reports the leaving of that tag to reader 110 and other readers in the nearby vicinity. If the consumer subsequently decides that they do not want that item and the consumer returns it to an adjacent shelf 312 such as the shelf read by reader 160 or 170, the system can then halt filtering of that item because it has been returned to a shelf. This eliminates the need to track the item through the entire store because it in fact has been put back on to the shelf inventory and is not going to be stolen. Reader 160 can issue an alert that that item needs to be returned to its proper location. An advantage of this embodiment is that items can be tracked through the store but it is not necessary to report all events to a centralized server which would rapidly become overwhelmed with items that are simply being moved through the store for purchase or moved from one shelf to another, as opposed to actually being stolen. As a result, because of the local filtering and prioritization of tag reads, it becomes possible to rapidly separate reads of importance from reads of lesser importance.

Although the system of FIG. 7 has been described with respect to a retail environment based on shelves stocked with individual items, the system can be implemented at other levels including, but not limited to, warehouses containing cartons, boxes or crates with individually tagged items, shipping containers with RFID tags, or any other set of tagged items. As such, the system can be applied to tracking and transportation systems in general where it is desirable to filter tag reads and to utilize sets of tag reads to determine location or movement of tagged items to prioritize the reading and tracking of particular items.

Figure 8:
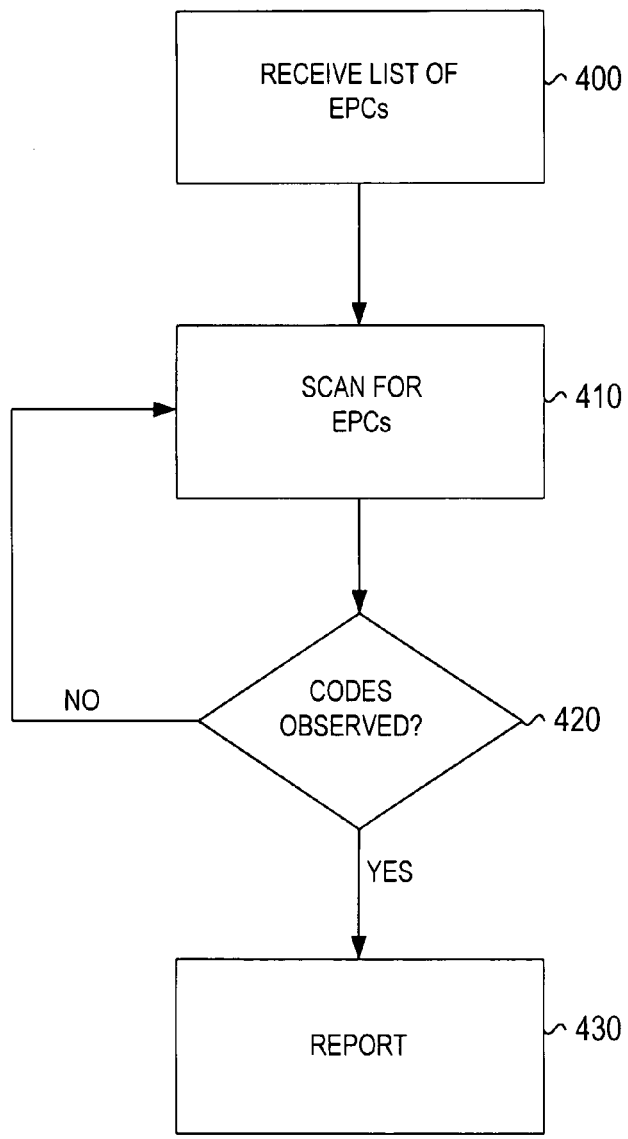
FIG. 8 shows a basic filtering process for identifying EPC codes.

FIG. 8 illustrates a basic filtering process that can be performed on existing codes such as the EPC code in the transponders. As can be seen in step 400, a reader receives a list of EPCs to be tracked. Then the list is passed onto a scan for those particular EPCs, step 410, which is followed by a code observed test, 420. This results in either a reporting, step 430, being executed, or a return to the scan for EPCs step 410, for further scanning.

Figure 9:
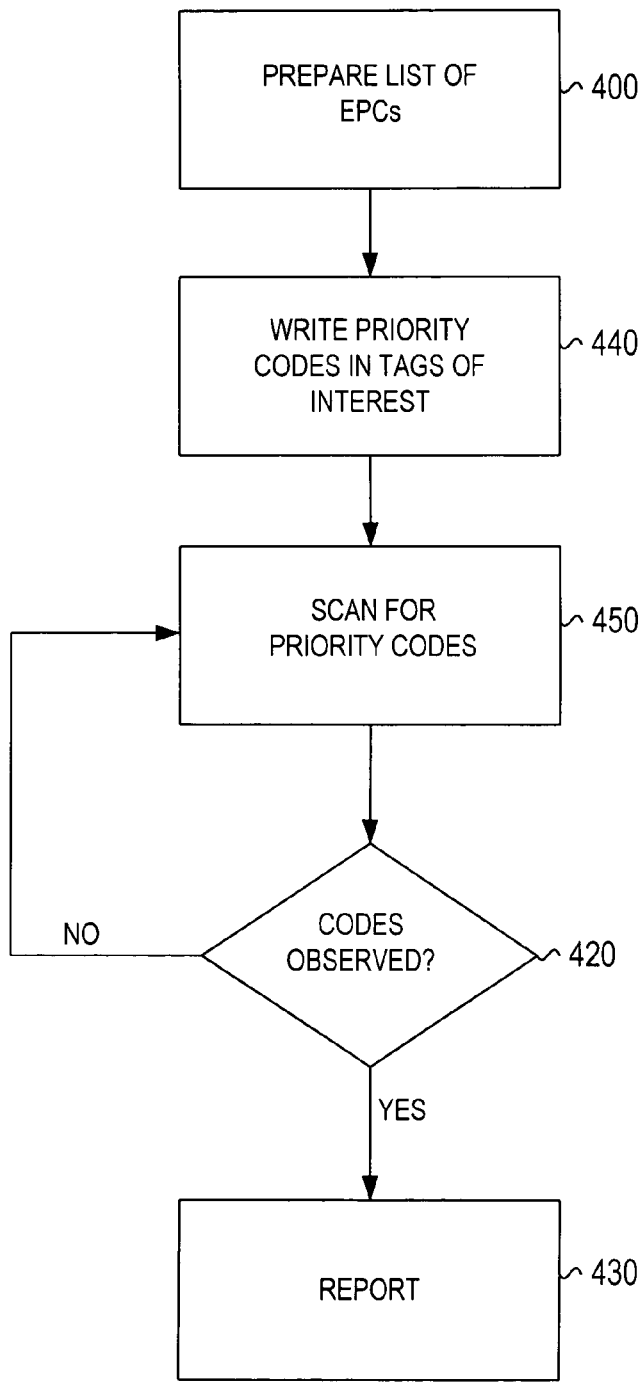
FIG. 9 shows the use of priority codes, which are written into the tag to form the basis for reporting.

FIG. 9 illustrates the use of priority codes that are written into the tag to form the basis for reporting. As shown in FIG. 9, a list of EPCs is received in step 400 and the reader, either alone or in combination with a centralized server, writes priority codes in the memories of the tags of interest, at step 440. As will be described, these codes may indicate various parameters about those items being tracked, but are specifically written in for the purposes of filtering and tracking so that the system may have codes for those purposes as opposed to simply relying on EPCs or other codes inherently existing in the tags. In a subsequent step 450, the reader scans for priority codes. A codes observed test, step 420, results in the reporting of those codes that were observed, step 430, or control may be returned to step 450 for further scanning.

Figure 10:
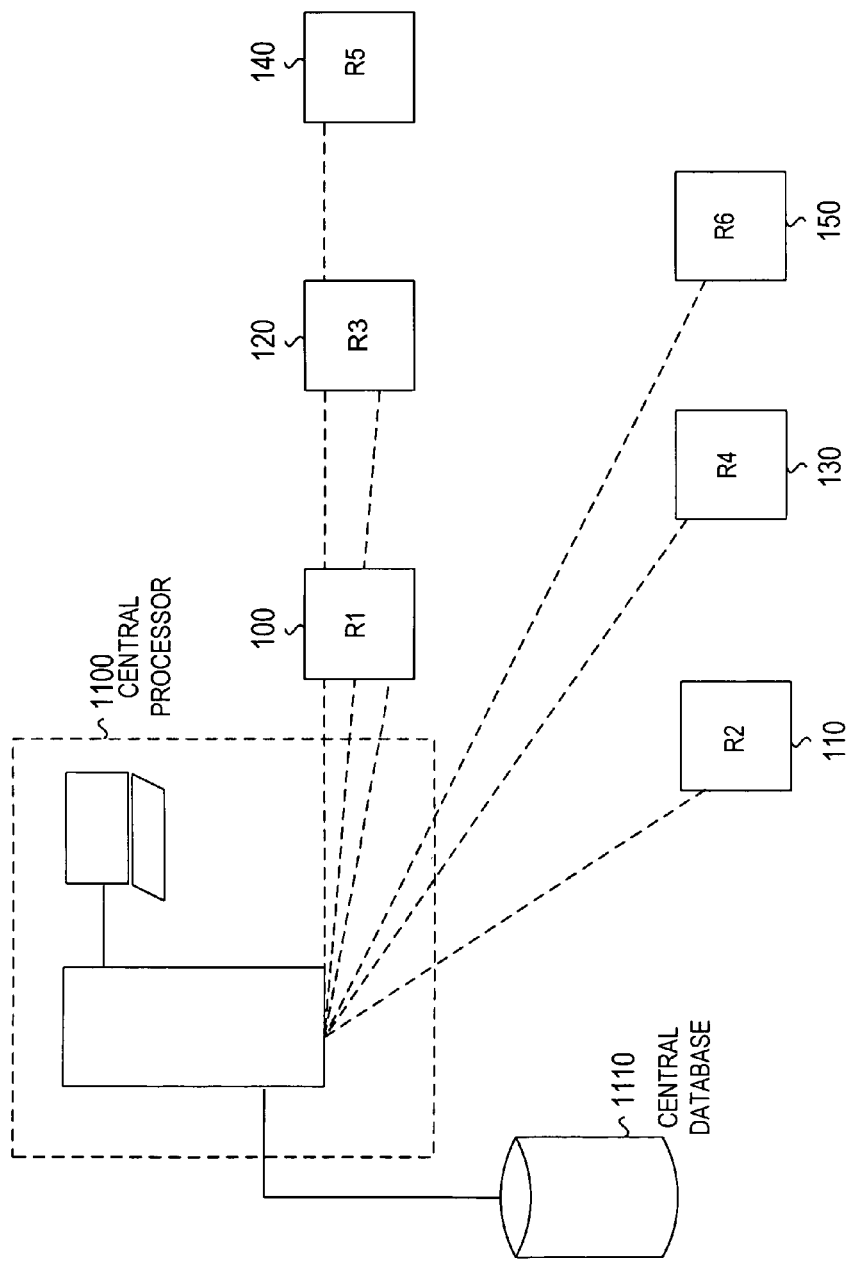
FIG. 10 illustrates a system in which readers are connected to a central processor and central database from which they can receive filtering parameters and instructions.

FIG. 10 illustrates a system in which readers 100, 110, 120, 130, 140, and 150 are connected to a central processor 1100 and central database 1110 from which they can receive filtering parameters and instructions regarding both filtering of tags and writing in of priority codes into tags. In this embodiment, the readers can be connected to the central processor 1100 through a wired network such as an Ethernet type network or other local area wired network, or may be connected to the central processor 1100 through a wireless network such as can be created with 802.11 technology. As will be understood by those skilled in the art, a high-speed data path can be connected between each reader and the centralized processor 1100 and database 1110.

Figure 11:
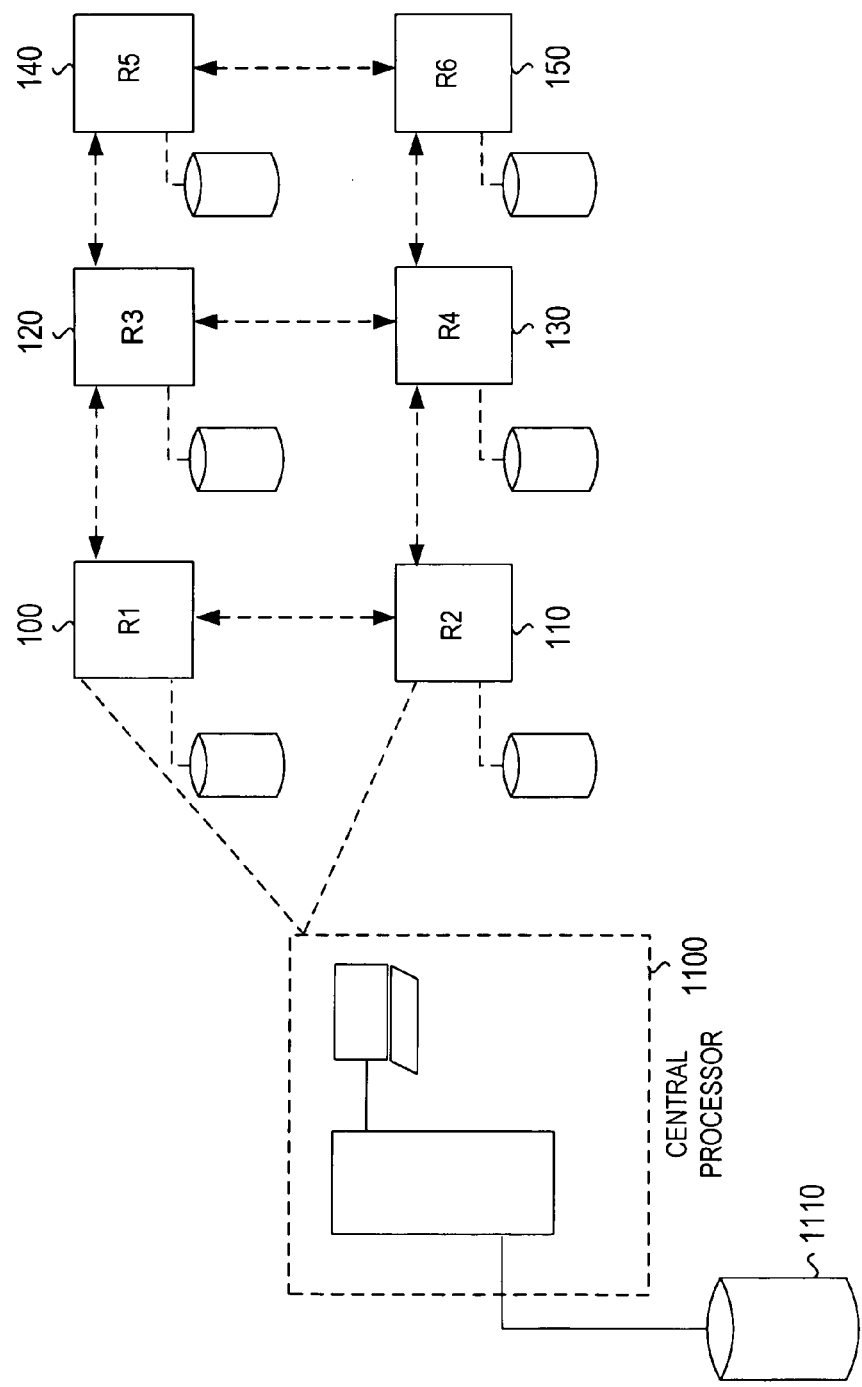
FIG. 11 illustrates a system in which connections between readers are established.

FIG. 11 illustrates that connections between readers can be established, either through direct interconnection of the readers or through establishment of an ad hoc network. In one embodiment, readers are connected to each other through wired or wireless networks and are instructed as to who their nearest neighbors are. In this embodiment, reader 120 is connected to readers 100, 140, and 130, and reader 120 is instructed that these are its neighbors. In this embodiment, reader 120 may be given instructions as to how to deal with communications from those neighbors. In an alternate embodiment, reader 120 simply discovers its neighbors and creates what is known as an ad hoc network and learns that it should report reads to its neighbors and that it can communicate back to the central processor 1100 through reader 100.

As can be appreciated by those skilled in the art, FIG. 11 illustrates how readers can be configured to establish communication path through each other back to the central processor 1100 and central database 1110, eliminating the need for direct connection between each reader and that centralized database. An advantage of the embodiment shown in FIG. 11 is that the readers in communicating with each other can pass filtering parameters as have been previously described. In either the ad hoc network or network that is intentionally created, having the readers interconnected allows for instructions and filtering data to be passed between readers without having to go back through the central processor 1100 and central database 1110.

Figure 12:
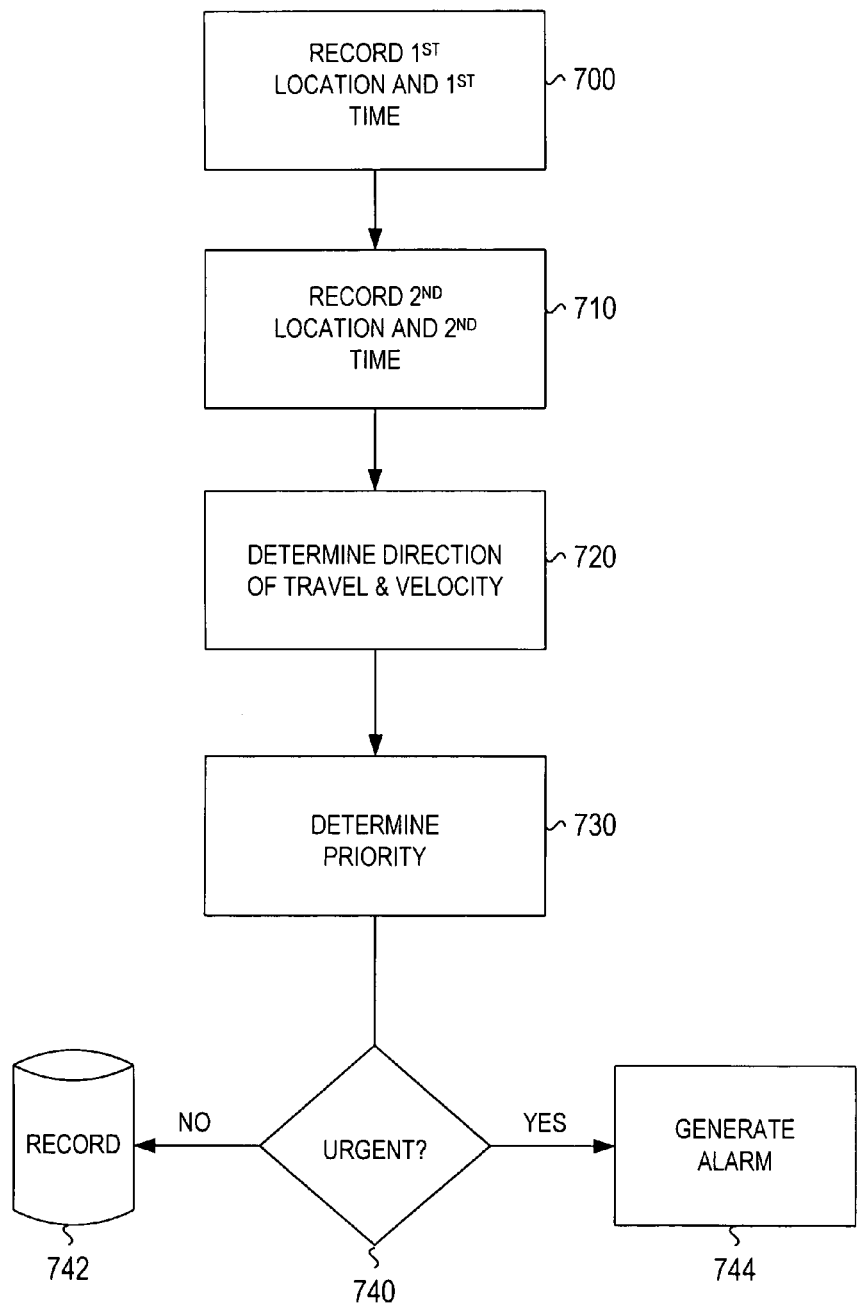
FIG. 12 illustrates a flow chart for determining velocity and also determining whether a tag should be read based on velocity alone or its velocity coupled with a priority field.

FIG. 12 illustrates a flow chart for determination of velocity and determining whether a tag should be read based on its velocity alone or its velocity coupled with a priority field. As illustrated in FIG. 12, a tag is read at a first location and the location and time at which it has been read is recorded in step 700. The tag is then read at a second location and the location and time of the reading is recorded in step 710. Based on those two parameters, step 720 can determine the direction of travel and velocity. Algorithms for determining the direction and velocity are well known by those skilled in the art and can be as simple as determining the distance between the two reads and the time difference to determine the velocity and direction of travel. As can be appreciated, some understanding of the location of the readers is necessary. Indicating the location of each reader in a centralized database or simply recording that location in the reader can accomplish this. That location may be in geographic coordinates such as those obtained through a GPS system, or may be store coordinates such as those corresponding to an aisle and end of the store. In an alternate embodiment, the exact location within the store in geometric terms is determined and recorded either in the reader or in the centralized database.

As shown in FIG. 12, once the velocity has been determined, the next step 730 is to determine the priority of that read based either on the velocity, a prioritization field within the tag, or a combination of the velocity and the prioritization tag. Based on one or more of these parameters, step 740 determines the urgency of the reporting of that read. If it is determined that the reading of that tag needs to be urgently reported, as when the tag is moving rapidly through the store, an alarm can be generated in step 744. Alternatively, if it is determined that that read is not critical, the reading of the tag, including the velocity and direction of travel and time of read can be recorded in step 742. Subsequent processing of the read can be performed to analyze the history of a particular item.

Figure 13:
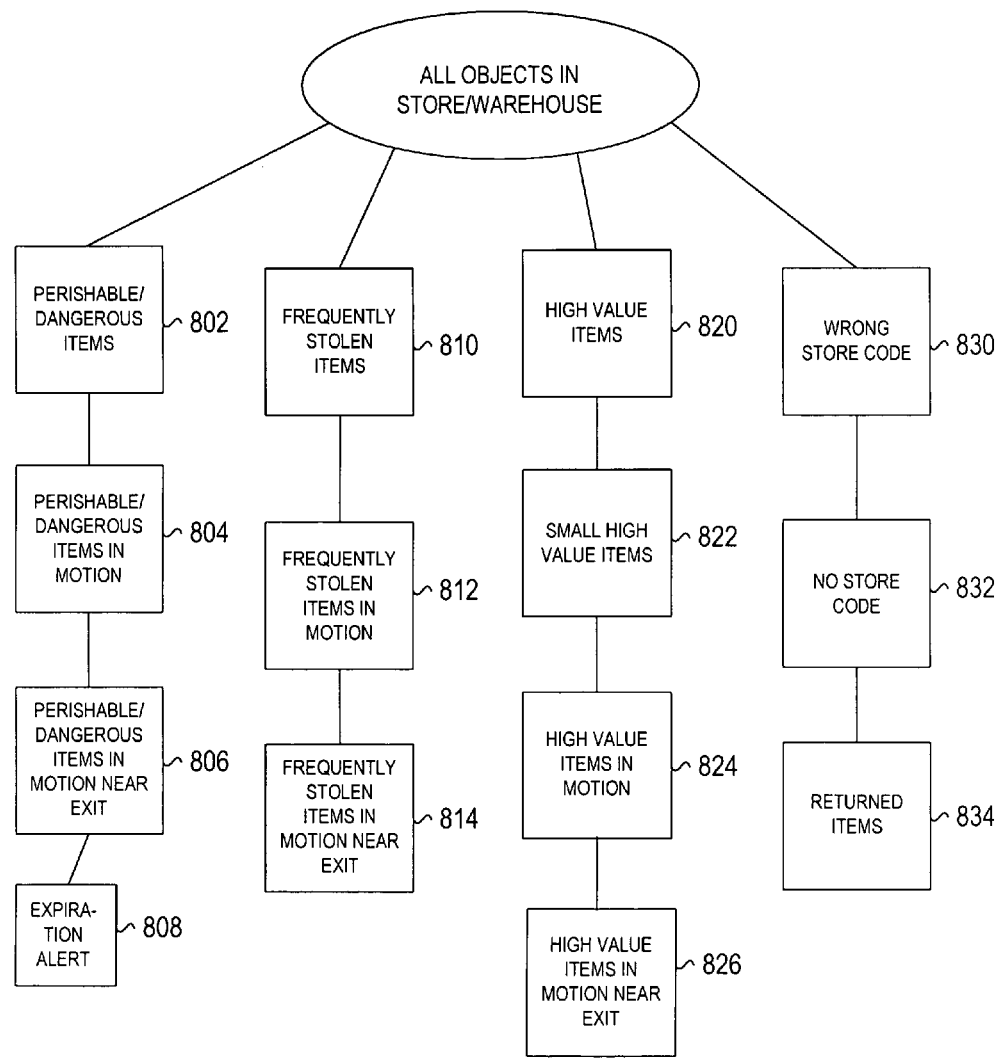
FIG. 13 shows a prioritization scheme which eliminates the need to rely simply on information stored in the read-only memory of the tag.

FIG. 13 illustrates a prioritization scheme that eliminates the need to rely simply on the EPC code or other information that is stored in the read-only memory of the tag (FIG. 2). As shown, instead of treating all objects in the store/warehouse 800 equally, items may be identified by specific parameters such as high-value items 820 or small high-value items 822, high-value items in motion 824, or high-value items in motion near the exit 826. Another set of fields that may be used are store codes and priority fields based on store codes, including a priority field indicating the wrong store code 830 (i.e. an item that has entered the store but did not emanate from the store), priority fields based on determination of no store code 832, or returned items 834. By writing in priority fields based on monitoring of those parameters, tags can be marked for prioritized filtering because they are likely to have entered the store in an illegal or inappropriate manner.

As also shown in FIG. 13, frequently stolen items 810 may be monitored as well as frequently stolen items in motion 812 or those items in motion near the exit 814. By writing into tags of items fitting those categories, those items can be efficiently and rapidly monitored. Similarly, perishable or dangerous items 802 in a store or warehouse may be prioritized by writing a field into those tags as well as perishable/dangerous items in motion 804 and perishable/dangerous items in motion near the exit 806. As will be appreciated by one skilled in the art, a variety of other schemes can be used to prioritize the reading of tags and appropriate data may be written into the tags such that those tags are preferentially filtered over all the multitude of tags in the store or warehouse.

With respect to perishable items, a particularly useful feature of this system is the ability to write a field into perishable items and track those items preferentially based on the "purchase by" date such that the item is not purchased after the "purchase by" date. In FIG. 13, step 808 illustrates that a perishable item, such as milk, that has gone beyond its expiration date may have a field written into the tag indicating that the associated milk should not be sold. Upon approaching a register or upon check out, that field alerts the retailer and the consumer that that item should not be purchased. In this embodiment, that particular field is utilized as opposed to returning to a centralized database to compare the item number with the origination date and make a calculation as to whether that item is sellable or not. The clear advantage is that the local filtering based on the priority code eliminates the need to return to the centralized database to make all determinations regarding that item and the salability of that item.

Figure 14:
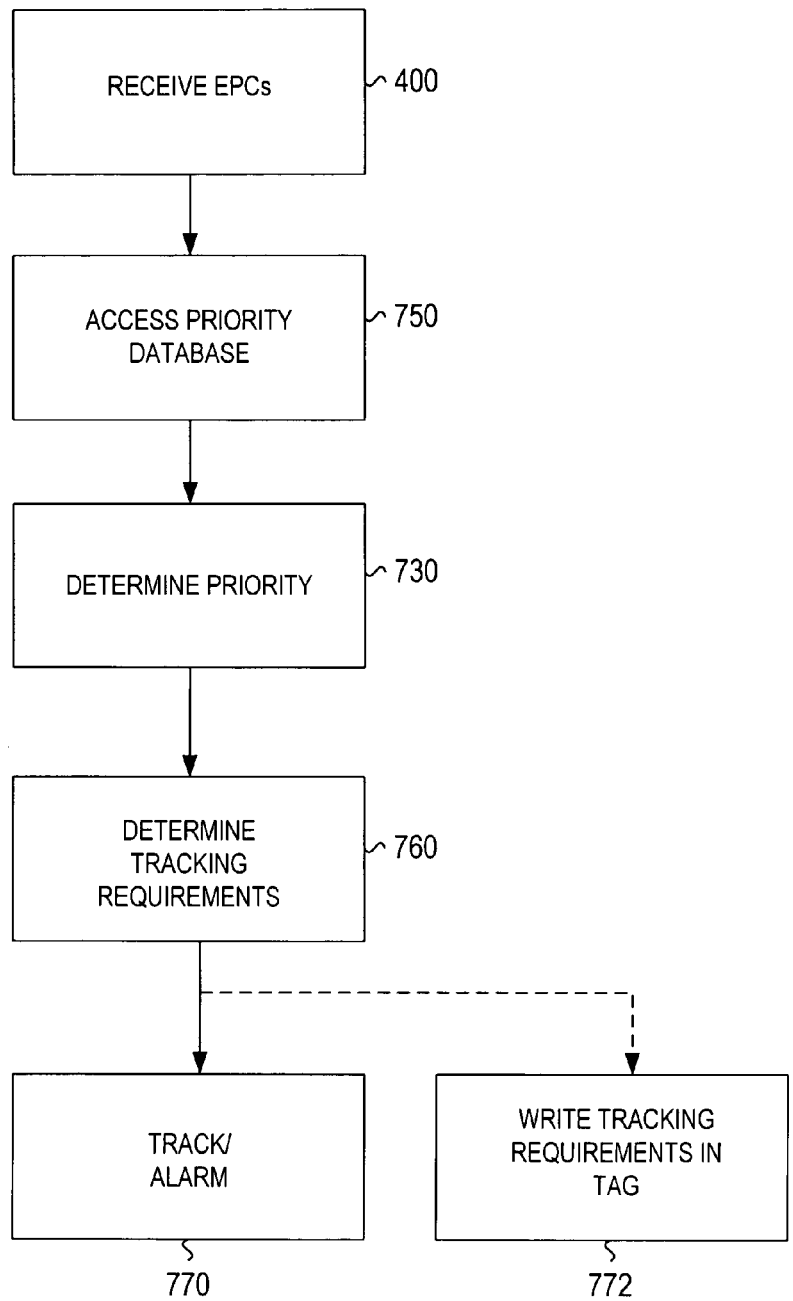
FIG. 14 illustrates a process for writing priority codes into tags or transponders.

FIG. 14 illustrates a process for writing priority codes into tags or transponders. As can be seen in step 400, EPC codes are received and a priority database is accessed in step 750. This priority database indicates the prioritization of tracking and indicates what codes should be written into the tags. In step 730 prioritization codes are determined and are then coupled with the subsequent step 760 of determined tracking requirements, which indicates how those particular tags should be tracked. The following step 770 is to set the readers up to a track or alarm based on the prioritization or, as shown in FIG. 14, to write tracking requirements in the tag in step 772.

Step 760 of determined tracking requirements can include combinations of velocity of an item with other parameters including, but not limited to, the types of prioritization codes shown in FIG. 13. In one embodiment single prioritization codes are utilized, while in another embodiment combinations of prioritization codes are utilized to establish tracking parameters. In yet another embodiment, prioritization codes are combined with velocity determinations to establish tracking parameters and reporting conditions/thresholds.

Figure 15:
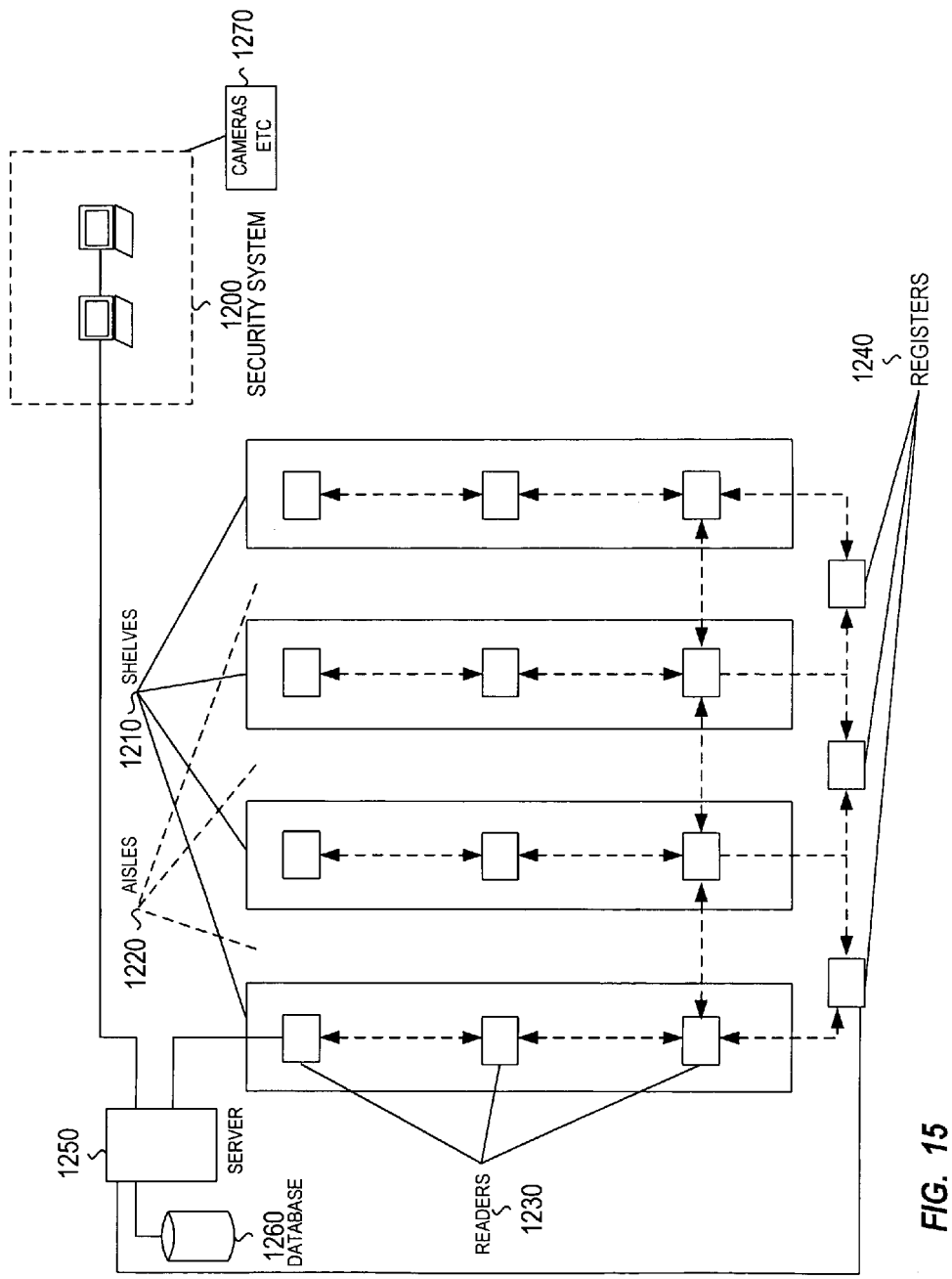
FIG. 15 illustrates an environment in which an embodiment of the system of the invention may be used.

FIG. 15 illustrates an environment in which one of the embodiments of the invention as described herein may be used. In this environment, which is typically a store or warehouse, there are shelves 1210 and aisles 1220. As shown in FIG. 15, readers 1230 are located above the shelves 1210, although in an alternate embodiment, the readers 1230 may be located above the aisles 1220. The readers 1230 are interconnected and also report back to a centralized server 1250 and database 1260. Readers 1230 are also in communication with registers 1240 such that items can be tracked at the registers either through RFID or through other mechanisms related to point-of-sale tracking. The registers 1240 are also connected to the centralized server 1250 and database 1260. A security system 1200 containing monitors as well as interconnections to cameras 1270 located in the store or which communicates with security personnel though personal alert devices, is also interconnected to the centralized server 1250 and can receive filtering and alarm information from the readers 1230. In this embodiment, the filtering may take place at the reader level such that the server 1250, security system 1200, and registers 1240 receive alarms related to particular prioritized items, rather than receiving tracking data for all of the items either in inventory or in motion in the store. An advantage of the present system is that only the information of importance is reported to the security system 1200 or registers 1240.

Figure 16:
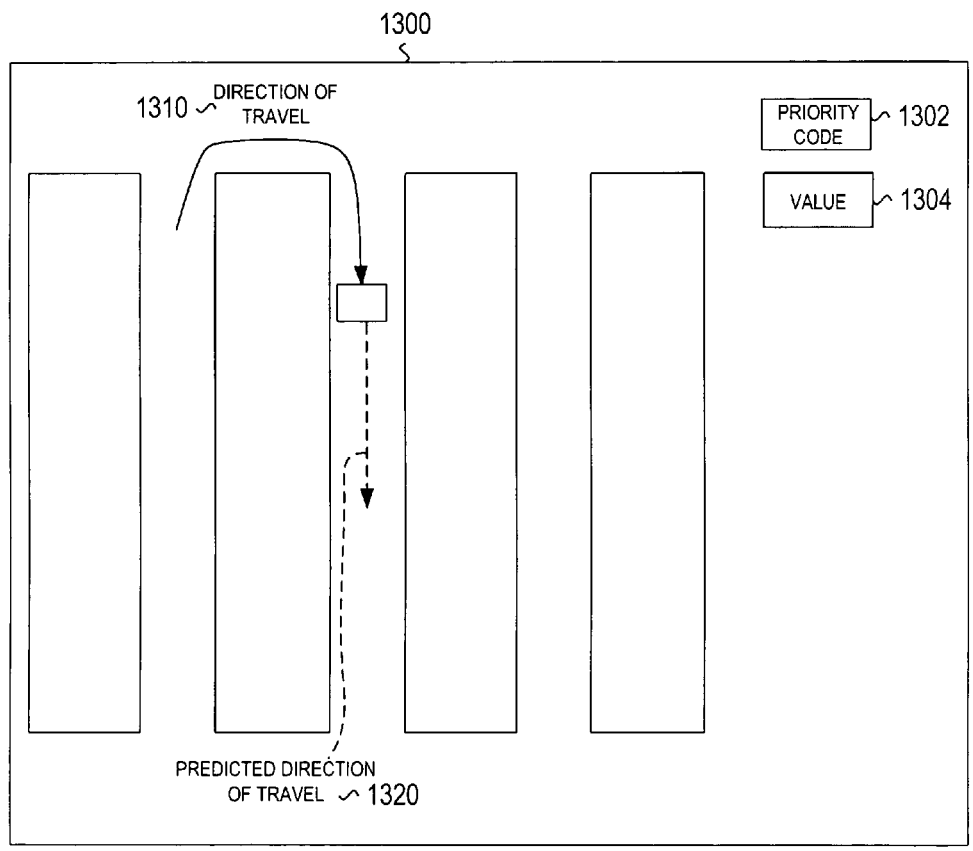
FIG. 16 illustrates a representative screen on a security system, personal alert device of a security personnel, or the monitor of a register.

FIG. 16 illustrates a representative screen 1300 on a security system, personal alert device of a security personnel, or the monitor of a register. The illustrative screen 1300 indicates that an item has a particular direction of travel 1310 as well as a predicted direction of travel 1320. As can be understood, the system enables tracking of that item in terms of its previous location and its predicted location. Additionally, a priority code 1302, either through a color or other marking of that item, may be assigned with a priority code key or indicator shown on the screen 1300. The value 1304 of the item may also be indicated. An advantage of this embodiment is that personnel are able to determine that a high value item of particular interest is moving through the store and should be further tracked. In one embodiment, items that are moving too rapidly through the store and are of high value are indicated to security personnel such that they may be tracked. In another embodiment, a large number of items may be tracked and the motion of those items through the store indicated on the screen 1300.

Although screen 1300 of FIG. 16 has been described with respect to a retail environment, it should be understood that the system can also be applied to warehouse, transportation networks, or any other systems used to track objects with RFID tags or transponders. As an example, items ranging from containers on cargo ships to livestock can be tracked and presented on a screen such as screen 1300, with parameters such as present direction of travel, predicted direction of travel or path, priority or value. By performing selective filtering or prioritization before presentation, it is possible to graphically present items of interest as opposed to presenting all read tags.

The screen 1300 in FIG. 16 may also show the location of the exits and, as a filtering parameter, the system may report an item that has taken a circuitous route through the store that is unusual and is potentially indicative of theft rather than sale. In this embodiment, an item that has taken an unexpected path is tracked and its location is reported. In one embodiment, items that have taken such a path are reported with increasingly higher alarms as they approach an exit of the store.

Figure 17:
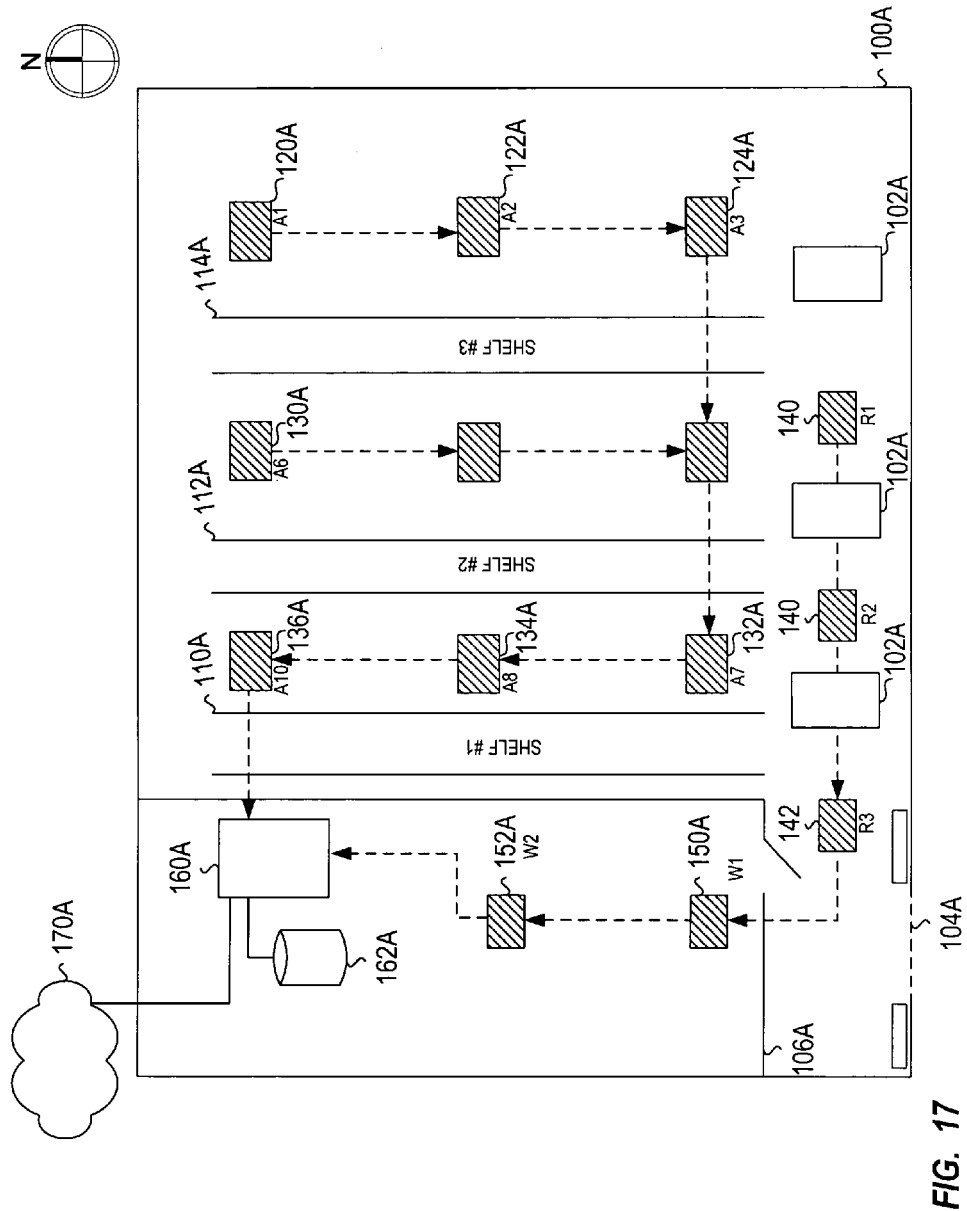
FIG. 17 illustrates an embodiment of the invention in a store where RFID readers are dispersed throughout the aisles of the store and interconnected in a network configuration so as to permit the RFID tag information to be filtered locally without accessing a central database.

FIG. 17 illustrates a store 100A that contains shelves containing goods, aisles between the shelves, an area of registers, and an exit, 104A. A storage area, 106A, is also contained within store 10A. In the embodiment of FIG. 17, there are three shelves, shelf 1-110A, shelf 2-112A, and shelf 3-114A. There are also a series of registers 102A that are located at the ends of the aisles between shelf 1-110A, shelf 2-112A and shelf 3-114A. A number of Radio Frequency Identification (RFID) readers are located in store 100A including aisle readers 120A, 122A, 124A, 126A, 128A, 130A, 132A, 134A, and 136A. As can be seen in FIG. 17, there are also readers in the storage area 106A of store 100A including warehouse readers 150A and 152A. In addition, there are three register readers located near the front of the store including register readers 138, 140, and 142. In the storage area 106 of store 100A are also included a server 160A with an accompanying database 161A, the server 160A being connected to a network 170A.

As can be appreciated from FIG. 17, the readers may establish interconnectivity such that the readers may pass information to each other and a routing system can be developed such as the one shown in FIG. 17 in which aisle readers pass information up the aisles and over to another aisle and finally through aisle reader 136A onto server 160A. Server 160A may then route that information to the network 170A or use the database 162A for further processing of that information. Similarly, register reader 138A may pass information to reader 140A which passes information to reader 142A which, in turn, passes that information to the warehouse reader 150A for communication to warehouse reader 152A, which then communicates it to the server 160A. FIG. 17 illustrates an example of how readers may be interconnected to establish interconnectivity to the server/network and is not meant to limit the number of ways in which readers can be configured and how information may be routed.

In the embodiment of FIG. 17, RFID tag information may be filtered locally without going to central database 162A. In one embodiment, the aisle readers perform reads on tags and go to a local database, stored within the reader and determine what action to take based on locally stored information. That information can include, but is not limited to, a prioritization code, stored in the local memory 214 of the transponder. As an example, an aisle reader can read a set of tags and determine, based on a locally stored prioritization code indicating that an item is perishable, that the expiration date of the item needs to be checked. The local reader can, based on the detection of a prioritization code indicating that a perishable item has been scanned, determine if the item is past its expiration date. In one embodiment this is accomplished locally without referring to central database 162A containing EPC codes and complete information about the product. In another case once the local reader recognizes the prioritization code, the local reader queries central database 160A with complete EPC information to determine if the item is past its expiration date. In both instances the determination as to whether or not further action is required is made locally without reference to a remote database containing the complete EPC information. One advantage of this system is that it allows information to be locally filtered and reduces the demands on the EPC database.

In another instance an aisle reader reads an item and determines, based on an observed prioritization code, that the scanned item is a high value item. In this instance the aisle reader generates a signal notifying one or more registers that a high value item has been placed in motion. In one embodiment, the registers are placed on alert to detect the presence of that particular EPC, thus confirming that it is being paid for. A time period for the item to appear at the register may be designated, and if the time period is exceeded, a security system can be notified. In another embodiment, a security system is notified immediately, and the progress of the item is monitored, through readings at the various readers in the store. The item may be tracked based on the prioritization code (each reader acknowledges that it has scanned an object with that prioritization code) or by monitoring the specific EPC. In yet another embodiment, the central database 162A is notified and sends out a broadcast to all readers indicating that all readers should be on the lookout for that particular EPC. In all instances the initial recognition of the object as an item of particular importance is made based on a prioritization code and with the requirement to access a database containing all of the EPC information.

Figure 18:
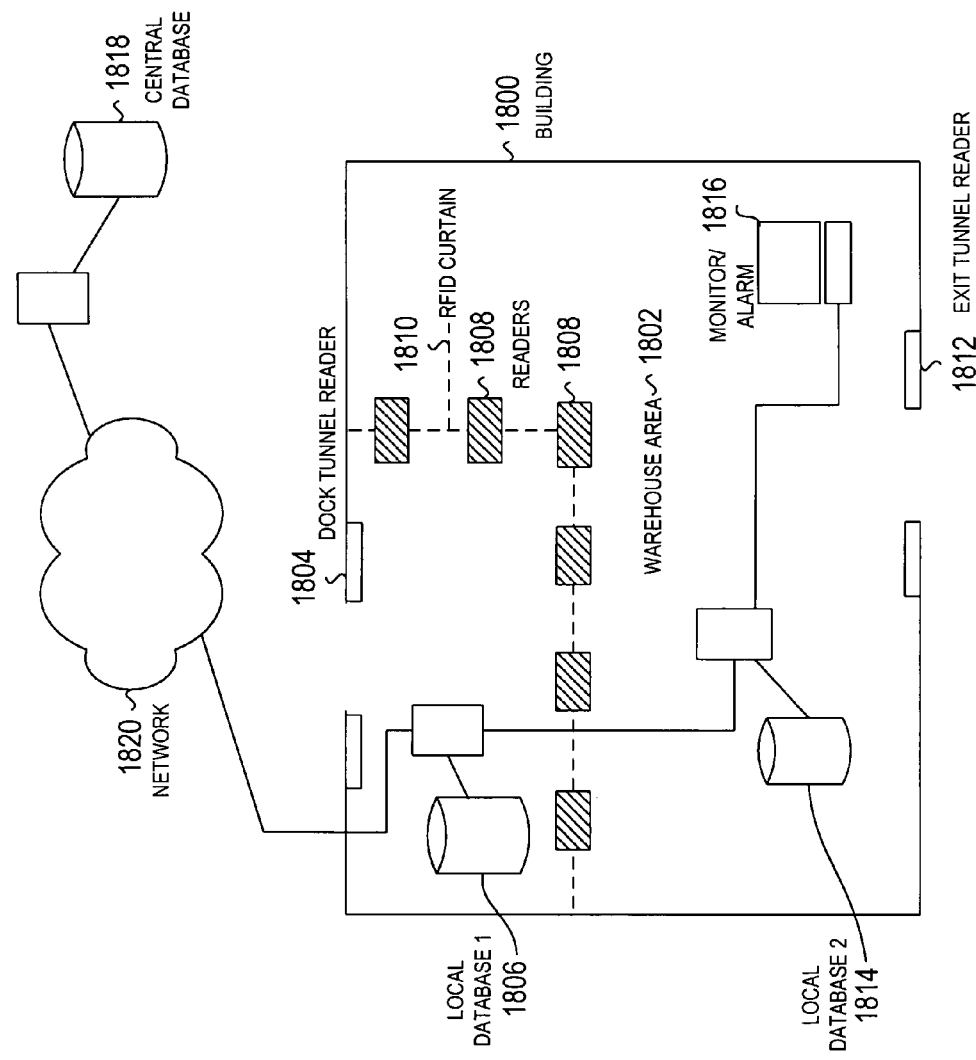
FIG. 18 illustrates an embodiment in which a building contains a warehouse portion with an entrance and a dock tunnel reader that scans items labeled with RFID tags as they pass through the dock and into the warehouse area.

FIG. 18 illustrates an embodiment in which a building 1800 contains a warehouse area 1802 with an entrance and a dock tunnel reader 1804 that scans items labeled with RFID tags as they pass through the dock and into the warehouse area 1802. A local database 1806 (local database 1) is contained within the warehouse area 1802. A set of readers 1808 creates an RFID curtain 1810 such that any object that leaves the warehouse area (which may be walled, fenced or open) is scanned. Towards the front of the building there is an exit tunnel reader 1812 that scans objects as they leave the building 1800. A local database 1814 (local database 2) and monitor/alarm system 1816 is also located towards the front of the building 1800. As illustrated, local database 1 may be connected to a central database 1818 via a network 1820. All of the readers within the building are interconnected via a wired or wireless network (not illustrated).

In one embodiment, items are scanned at the dock tunnel reader 1804 and, based on the presence of one or more prioritization codes, actions are taken to either inform or query the central database 1818 regarding the presence of the scanned items, simply register the presence of the items in local database 1 1806, or inform local database 2 1814, the monitor/alarm system 1816, or other readers of the presence of the scanned items and alert those other systems to perform actions or report the detection of items in a prioritization group or an item with a particular EPC. In all instances, local decisions can be made based on codes associated with EPCs (such as prioritization groups that relate sets of EPCs), codes assigned with individual tags, or codes written into the particular tags. Because the decisions are made locally the system avoids the necessity of having to query an EPC database for each scanned item.

Figure 19:
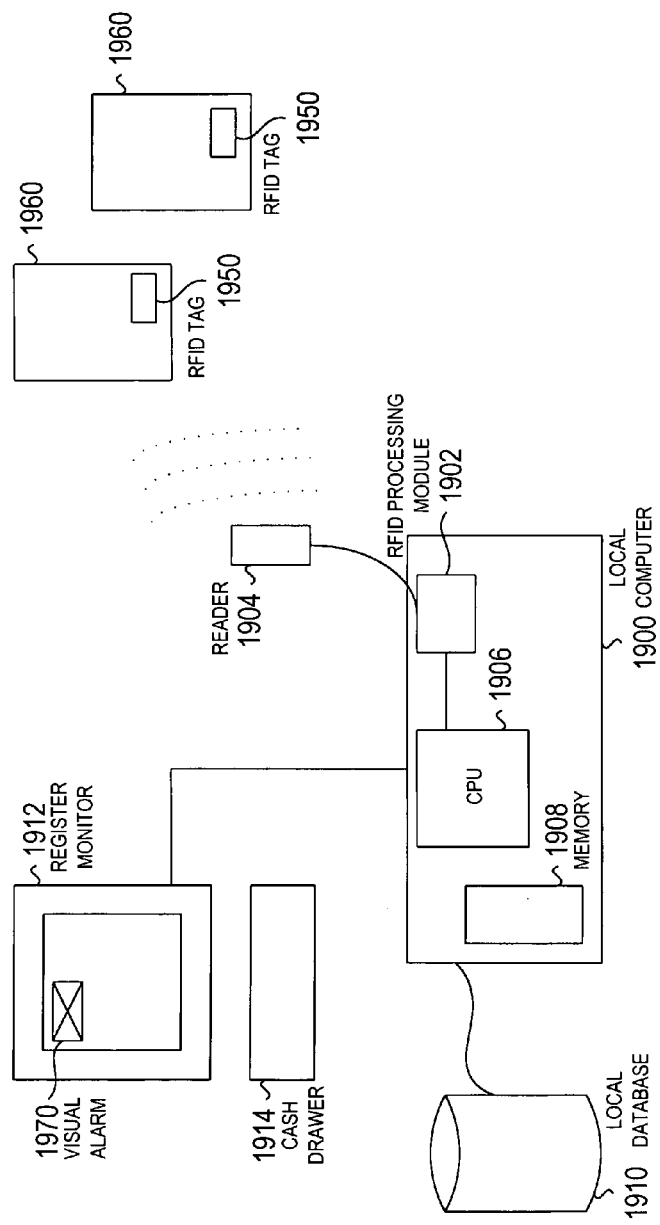
FIG. 19 illustrates an RFID scanning system with local processing capability, similar to what may be found at an RFID enhanced cash register.

FIG. 19 illustrates an RFID scanning system with local processing capability, similar to what could be found at an RFID enhanced cash register (FIG. 17). A local computer 1900 contains an RFID processing module 1902 that is connected to a reader 1904 and to a CPU 1906 that is connected to memory 1908 and a local database 1910. A register monitor 1912 is present as is a cash drawer 1914, both of which are connected to the local computer 1900 to provide complete register functionality.

As illustrated in FIG. 19, in one embodiment RFID tags 1950 on items 1960 are scanned and the EPCs read to determine if there are items that fall within certain prioritization groups. This can be performed on the local computer 1900 through association of the EPCs with prioritization groups, and with completing lookups on each EPC. In another embodiment, prioritization codes are stored directly on the RFID tags, read by the reader 1904, and processed by the local computer 1900 to determine what actions to take.

In the event that the prioritization codes indicate that an RFID tagged item needs to be reported immediately, a visual alarm 1970 can be indicated on register monitor 1912.

An example of an application of the present system is the use of the system to track prioritized items in the retail environment, such as a store. In this application tagged items are read by one or more readers, those readers working individually or in cooperation to determine which items should be reported to monitoring systems and external databases. In the retail environment, items of high value, perishable items, or dangerous items may be tracked preferentially and location and direction information with respect to those items processed and reported ahead of any other information related to other items. As a result, personnel involved in the monitoring of the store are alerted to specific items having particular importance rather than having to make decisions as to which items should be preferentially tracked.

Another application of the system is the use of the system to track prioritized items in transit. As an example, tagged items may be present in the form of containers holding cargo such as containers used in railroad or ocean shipping. Use of the present system allows tracking and reporting of specific containers that are marked, either in a database or within the tag on the container, as having a priority code that requires tracking for a particular reason. As such, those specific containers are reported preferentially, and personnel monitoring the items in transit see the particular items being tracked based on individual priority codes, combinations or priority codes, or combinations of priority codes with velocity or direction information. In one embodiment, historical location information can be used in combination with priority codes or velocity or direction information to determine that a specific item should be tracked. Similarly, livestock may be tracked with preferential tracking of livestock that have a particular history, likelihood of infection, or other characteristic that requires preferentially tracking.

The system can also be used to examine historical information including location history to both establish priority codes as well as to provide the basis for filtering of items to be reported. As an example, the location of items in a retail, warehouse, or transportation environment may be stored and subsequently analyzed to determine if a priority code is applicable. In one embodiment, items that have traveled from one store to another are marked as special inventory that should be tracked preferentially over other items. In another embodiment, items that have remained on the shelves for an extended period of time and been subsequently placed in the warehouse are marked with priority codes. These priority codes can be used by the system to indicate to store personnel that those items should be placed on sale and perhaps moved to the front of the store for inventory reduction. Alternatively, the priority codes may be used to indicate that those items should be, after a specified period of time, returned to the manufacturer. Use of the present system allows for the creation of groups of items with particular priorities and allows for preferential tracking and reporting of those items.

Although FIG. 13 illustrates a particular set of categories or priorities that can be developed, a number of other categories and priorities can be developed based on manufacturer, item characteristics, item history, item location, associations of items (such as groups of items in a shopping cart). In addition, time dependent priorities can be established such that priority codes, in a database or recorded within the tag of an item, change dependent on the time or date. As an example, an item may be tagged as perishable with a expiration date of Jan. 11, 2005. If that tag is read subsequent to that date, the reader may indicate to a central database, or to the tag on the item itself, that the item is expired and generate a priority code indicating an expired item. That priority code can be used by a subsequent reader to note the expired item without the necessity of performing the calculation again and determining that the item is expired. In one embodiment a local reader simply notes that the item has a priority code indicating expiration and reports that to a cash register. In this embodiment no query to a central database is or additional calculation to determine expiration is required. In another embodiment an item in transit is assigned a priority code based on the amount of time it has been in transit. Readers reading that item notify one or more systems, based on the priority code, of their having read the item. The location or presence of the item is reported to personnel because of the association of that item with the priority group, without requiring access to another database associating the serial number of the item with a detailed history or set of rules. By assigning priority codes to the item based on parameters such as amount of time in transit, the item is rapidly identified by the system and brought to the attention of the personnel involved in monitoring the system Although this invention has been illustrated by reference to specific embodiments, it will be apparent to those skilled in the art that various changes and modifications may be made that clearly fall within the scope of the invention. The invention is intended to be protected broadly within the spirit and scope of the appended claims.

What is claimed is:

1. A method of filtering RFID tag information, comprising the steps of:
   creating prioritization groups based on EPC codes, wherein the prioritization groups identify action to be taken and do not require lookup of EPC information in a central database;
   locally storing prioritization group data;
   reading an RFID tag including an EPC code for an associated product, wherein the reading step includes the step of reading the RFID tag at a first location;
   locally associating the read EPC code with a prioritization group; and
   performing an action designated for the identified prioritization group, wherein the designated action includes the step of notifying an RFID reader at a second location that an item within the prioritization group has been read at the first location.

2. The method of claim 1, wherein the prioritization group data is stored in the RFID tag.

3. The method of claim 1, wherein the association of the EPC code with a prioritization group is performed at an RFID reader.

4. A method of filtering RFID tag information, comprising the steps of:
   creating prioritization groups based on EPC codes, wherein the prioritization groups identify action to be taken;
   locally storing prioritization group data;
   reading an RFID tag including an EPC code for an associated product, wherein the reading step includes the step of reading the RFID tag at a first location with a first RFID reader;

associating the read EPC code with prioritization group in a central database; and performing an action designated for the identified prioritization group, wherein the designated action includes the step of notifying a second RFID reader at a second location that an item within the prioritization group has been read at the first location.

5. The method of claim 4, wherein the prioritization group data is stored in the RFID tag.

6. A method of filtering RFID tag information, comprising the steps of:

creating prioritization groups based on EPC codes, wherein the prioritization groups identify action to be taken and do not require lookup of EPC information in a central database;

storing prioritization group data on an RFID tag;

reading an RFID tag including prioritization group data, wherein the reading step includes the step of reading the RFID tag at a first location with a first RFID reader; and performing an action designated for the identified prioritization group without referring to the EPC, wherein the designated action includes the step of notifying a second RFID reader at a second location that an item within the prioritization group has been read at the first location.

7. A method for selectively tracking a Radio-Frequency Identification Device (RFID) tag, the method comprising:

reading the RFID tag using a first reader to create a first reading, wherein the position of the first reader is known;

recording the first reading including the time at which the RFID tag was read by the first reader to create a time dependent first reading;

reading the RFID tag using a second reader to create a second reading, wherein the position of the second reader is known;

recording the reading of the RFID tag by the second reader including the time at which the RFID tag was read by the second reader;

calculating the direction in which the RFID tag was proceeding based on the first reading and the second reading;

creating prioritization groups based on EPC codes, wherein the prioritization groups identify action to be taken;

storing the prioritization group data in the RFID tag; and initiating tracking of the RFID tag if the prioritization group data stored in the RFID tag indicates that a product associated with the RFID tag is designated to be a high priority item for which tracking is required based on the direction in which the product is headed.

8. The method of claim 7, further comprising calculating the velocity of movement of the RFID tag based on the first reading and the second reading and tracking of the RFID tag if the velocity is above a threshold or if movement is in an area where an item associated with the RFID tag is in danger of being stolen.

* * * * *